Jan. 22, 1929.
C. R. RUTH
1,699,924
AUTOMOBILE OIL INDICATOR
Filed May 7, 1928
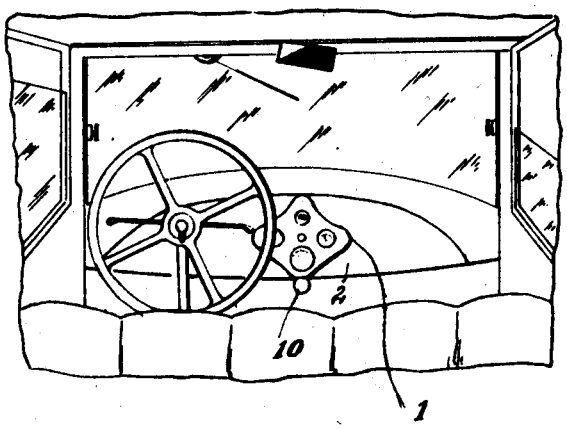
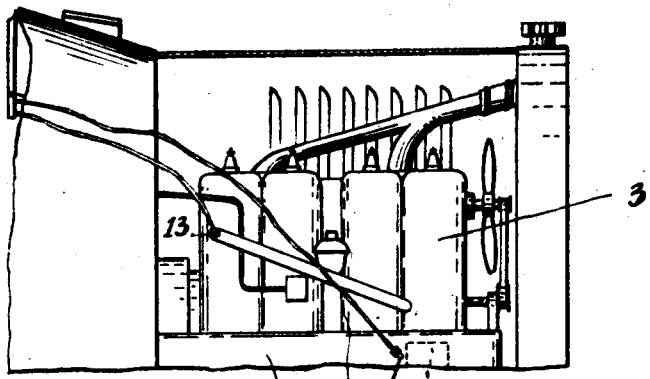
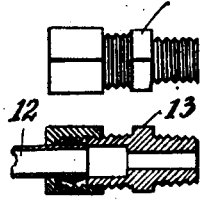
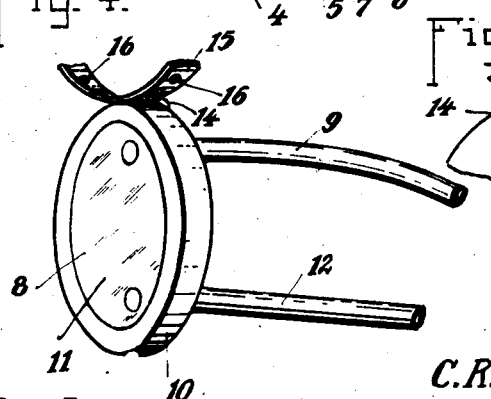
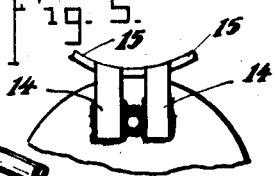
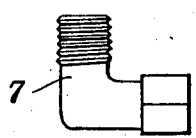

Patented Jan. 22, 1929.

1,699,924

UNITED STATES PATENT OFFICE.

CLAUDE R. RUTH, OF CLEVELAND, OHIO.

AUTOMOBILE OIL INDICATOR.

Application filed May 7, 1928. Serial No. 275,581.

This invention relates to improvements in lubricating systems, and particularly of the type especially adapted for delivering lubricant to the bearings of internal combustion engines, and more particularly to the type of distributing pump and with a panel for indicating conditions of and incident to the action of the engine.

An object in view is the visual display of evidence of an operative or inoperative condition of the lubricant circulatory system.

A further object in view is the application of the visual features of such construction to a panel already in use without interfering with either the mechanical function or attractive appearance of the panel. With these and further objects in view as will in part become apparent and in part be hereinafter stated, the invention comprises the details of construction for the visual indication of continuous oil flow during operation as will be hereinafter set forth in greater detail, and subsequently pointed out in the appended claims.

In the accompanying drawings,

Figure 1 is an elevation of the panel board of an automobile having applied thereto an embodiment of the present invention.

Figure 2 is a side view of the engine and a fragment of the car body having applied thereto an embodiment of the invention, parts being broken away for disclosing structure otherwise obscured.

Figure 3 is a detail view in side elevation of one of the couplings connecting the lines with the engine.

Figure 4 is a perspective view of the panel dial and its anchorage means forming a part of the present invention, the communicating tubes being partly broken away.

Figure 5 is a fragmentary rear view of the parts seen in Figure 4, the disclosed distributing tube being seen in section.

Figures 6 and 7 are respectively, an elevation of a longitudinal section through one of the communicating nipples and—

Referring to the drawing by numerals, 1 indicates the instrument board of an automobile, preferably one of the types recently popularized, which board is provided with an instrument panel 2 having a group of instruments customarily employed such as the ignition switch, the ammeter, the motor-meter, and the speedometer. Other instruments of course may also be present, such as a vacuum-meter, a clock, and a light. All such instruments are employed for indicating the speed and other conditions of the internal combustion engine 3 and parts driven thereby. The engine 3 includes the usual crank casing 4 and is provided with an overflow pipe 5 which may communicate with the crank housing 4 in any well known manner, but is preferably arranged to upstand a lateral incline and located approximately midway of the length of the blocks on the cylinders on the engine 3. The engine ring is not illustrated in detail since it forms a part of the present invention, and is well understood. Such engine ring includes an oil pump indicated in dotted lines at 6 for distributing oil under pressure to the various bearings.

The present invention provides for indicating the successful operation of the pump and the continued circulation of the oil during normal function, and is particularly designed to indicate cessation of circulation, should such misfortune occur. It is of course vital that the operator should know that the bearings of his engine are being constantly lubricated. Absence of lubrication for only a single moment is usually sufficient for destroying a bearing, and while in many automobiles on the market there is absence of any demonstrating means manifesting continuance of oil circulation, the desirability of such demonstration is obvious.

The present invention provides for such demonstration by tapping into the discharge communication from pump 6 as by the use of an L-nipple 7 seen in detail in Figure 7. Extending from the nipple 7 to a gauge 8 is a circulating tube 9. The gauge dial 8 may be of any artistic contour or appearance to correspond with and add beauty to the finish of the panel on the instrument board, but mechanically consists of an appropriate housing 10 including a glass front piece 11. The upper end of the housing communicates with the tube 9. The lower end of the housing communicates with a tube 12 which leads through the cowl back to communication with the crank housing 4. Such communication preferably consists of a nipple 13, seen in detail in Figures 6 and 7, which nipple communicates through the cap 13 of the overflow pipe 5.

Thus in operation so long as the pump 6 functions effectively and the oil stream is maintained to the several bearings, the tube 9 will function as a small by-pass allowing a fractional proportion of the streaming lubricant to flow to and through the gauge 11 and back to the source of supply for the pump 6. Should the pump cease to function, cessation of flow in the gauge 11 will demonstrate to the operator the fact that his oil circulating system is out of operation. On the other hand, if the line from the pump 6 should become clogged beyond the point of communication of nipples 7, the effort of the pump to force the whole stream through the tube 9 would become at once manifest from both the rapidity and volume of flow through the gauge 11 so that gauge 11 provides an effective tell-tale for the condition of the lubricant circulatory system of the engine.

The dial 8 may be mounted in any various ways, but preferably as arranged in such relation to the instrument panel 2 as to agree with the appearance of the parts and not present evidence of a supplement or a second thought application. To this end straps 14—14 are affixed to the rear of the housing 10 as by being welded or soldered thereto, and the upper ends of the straps carry a bracket 15 that may be formed integral therewith. The bracket 15 is an arcuate strip preferably formed in apertures 16 for receiving anchoring pins or bolts for connecting the strap to the lower margin or within the lower margin of the panel 2. The bracket 15 may be otherwise anchored when preferred.

What I claim is—

1. The combination with an internal combustion engine having an oil pump and oil circulating system, of a by-pass comprising inlet and outlet tubes leading from the stream discharging from the pump and discharging to the source of supply of the pump, and a circular gauge in the length of said by-pass having a transparent face for visually demonstrating the condition of flow of oil through the by-pass, the inlet tube being connected to the gauge adjacent the top thereof and the outlet tube being connected thereto adjacent the bottom.

2. The combination with an internal combustion engine having an oil pump and oil circulating system, of a by-pass leading from the stream discharging from the pump and discharging to the source of supply of the pump, a gauge in the length of said by-pass for visually demonstrating the condition of flow of oil through the by-pass, a panel housing for said gauge, and arcuate resilient means for securing said housing to the instrument board of an automobile.

3. The combination with an internal combustion engine having an oil pump and oil circulating system, of a by-pass leading from the stream of discharging from the pump and discharging to the source of supply of the pump, a gauge in the length of said by-pass for visually demonstrating the condition of flow of oil through the by-pass, a panel housing for said gauge, a strap anchored to the housing, and an arcuate bracket affixed to the strap above the housing for suspending the housing to an instrument board.

4. The combination with an automobile body and an internal combustion engine having an oil circulating system therefor, an instrument plate on said body and a gauge in said system having a casing and means on said casing resiliently conformable to the contour of the instrument plate for attaching the casing to said plate.

5. In an automobile body having a dashboard and an oil circulation system, an instrument plate on said dashboard and a gauge in the oil circulating system, said gauge being detachably mounted on the instrument plate so as to form a part thereof and to be suspended thereby below the dashboard.

In testimony whereof I affix my signature.

CLAUDE R. RUTH.